US005941769A

United States Patent [19]

Order

[11] Patent Number: 5,941,769

[45] Date of Patent: Aug. 24, 1999

[54] GAMING EQUIPMENT FOR PROFESSIONAL USE OF TABLE GAMES WITH PLAYING CARDS AND GAMING CHIPS, IN PARTICULAR FOR THE GAME OF "BLACK JACK"

[76] Inventor: Michail Order, Ostlandstrasse 96, Köln, Germany, D-50859

[21] Appl. No.: 08/817,215

[22] PCT Filed: Oct. 5, 1995

[86] PCT No.: PCT/DE95/01389

§ 371 Date: Mar. 27, 1997

§ 102(e) Date: Mar. 27, 1997

[87] PCT Pub. No.: WO96/14115

PCT Pub. Date: Mar. 17, 1996

[30] Foreign Application Priority Data

Nov. 8, 1994 [DE] Germany ............................ 44 39 502

[51] Int. Cl.$^{6}$ .............................. A63F 9/24; G06F 15/28

[52] U.S. Cl. .......................... 463/12; 463/25; 273/149 R; 273/309

[58] Field of Search .............................. 463/1, 16, 12–13, 463/25, 29–30, 36, 40–42; 364/410.1, 412.1; 273/138.2, 139, 149 R, 309, 237, 293

[56] References Cited

U.S. PATENT DOCUMENTS

| | | | |
|---|---|---|---|
| 4,531,187 | 7/1985 | Uhland | 463/12 |
| 5,374,061 | 12/1994 | Albrecht | 273/149 R |
| 5,393,067 | 2/1995 | Paulsen et al. | 273/309 |
| 5,451,054 | 9/1995 | Orenstein | 273/309 |
| 5,770,533 | 6/1998 | Franchi | 463/25 |

*Primary Examiner*—Jessica J. Harrison
*Assistant Examiner*—Mark A. Sager
*Attorney, Agent, or Firm*—Michael J. Striker

[57] ABSTRACT

For professional use in table games of chance with playing cards and gaming chips (jettons), in particular the game of "Black Jack", the to provide invention is to provide an automatically working apparatus which will register and evaluate all phases of the run of the game automatically. This is achieved by a card shoe with an integrated device for recognition of the value of the drawn cards (3') (optical recognition device and mirroring into a CCD-image converter); photodiodes (52) arranged under the table cloth (51) in order to register separately the casino light passing through each area (53, 54) for placing the gaming chips (41) and areas (55, 56) for placing the playing cards (3) in dependence of the arrangement or movement of the jettons and playing cards on the mentioned areas; a device for automatic recognition of each bet (scanner to register the color of the jettons, or a RFID-system comprising a S/R station and jettons with integrated transponder); an EDP program created in accordance with the gaming rules to evaluate and store all data transmitted from the functional devices to the computer; and a monitor to display the run of the game and players' wins.

16 Claims, 2 Drawing Sheets

2
33
1

11,6
8
2
1
7
15
16
4

1
3'
5
13
12
3'
6
3
14
9
16
17
10
15
4
18

GAMING EQUIPMENT FOR PROFESSIONAL USE OF TABLE GAMES WITH PLAYING CARDS AND GAMING CHIPS, IN PARTICULAR FOR THE GAME OF "BLACK JACK"

BACKGROUND OF THE INVENTION

Field of the Invention

The invention concerns a gaming apparatus for professional use in monitoring and evaluating games of chance such as "Black Jack" and related games using playing cards and gaming chips (jettons).

The following description of the field of invention mainly relates to the game of "Black Jack" which will be used by the way of an example.

Conventionally gaming equipment for "Black Jack" basically consists of a gaming table and a card dispenser in the form of a card slide, which is also referred to as card shoe, because of its shape.

"Black Jack" is played with 1 to 8 decks each consisting of 52 cards, whereby the player plays against the bank (house) and the house is represented by the croupier, also called dealer at the game of "Black Jack".

Every deck of cards consists of four suits of cards, Hearts, Diamonds, Clubs and Spades. Each suit has nine numbered cards and four pictured cards, with the picture of Jack, Queen, King and Ace. The number cards are designated by their numbers 2 through 10 and the picture cards are designated by their initials: J (Jack), Q (Queen), K (King) and A (Ace). The name of each card is a combination of its value and its suit (e.g. Queen of Diamonds). In the game of "Black Jack" the value of points of the ace may be selected by choice to be either 1 or 11, the value of points of the picture cards (Jack, Queen, King) is 10 and the gaming value of all other cards equal to their faced value; the colors or suits have no meaning to the game.

Prior to the start of the first game the cards are carefully shuffled by the dealer, preferably by using a card shuffling device, and then placed into the card shoe in such way, that the neutral backside of the cards shows forward, that is into direction of the card delivery opening of the card shoe.

The "Black Jack" table is covered by a piece of cloth (gaming layout) which is essentially divided into rectangular or round betting fields (boxes, hands) arranged like half a circle and designated for placement of the bets in form of gaming chips. At the left side of each box there is an insurance field (line). One part of the gaming table is designated for placement of the cards for the players and the dealer.

The basic features of the game of "Black Jack" are as follows:

As many players (or groups of players) as the gaming area has boxes, may take action (generally seven).

Target of the players is to achieve a higher score than the bank. The highest score which must not be exceeded neither by the players nor by the bank, is 21. The player or the bank has "Black Jack" and wins, if they have reached a score of 21 with the received first two cards. Otherwise the party being closer to the score of 21 has won. In case of same score for both parties the player does not win nor loose, and he can withdraw his bet or play it again or raise or reduce it for the next game.

According to internationally determined rules of gaming performance, placing bets and distribution of cards are done as follows. First each player makes his bet; if more then one chip is placed, the chips are stacked with the highest denomination at the bottom of the stack and the lowest denomination at the top. Then the dealer distributes the cards from the left to the right so that first each player and then the dealer receives the first card face up. After that each player receives the second card also face up and then the dealer his second card but face down. If the player has not gotten "Black Jack" he may ask the dealer for more cards face up.

When all the players' cards have been dealt the dealer turns his face down second card to face up. If the dealer's score is 17 or higher he must not take another card; if his score is less than 17, he has to take further cards until his score has reached or passed 17.

In addition, under certain circumstances and conditions there may apply gaming variations, such as "Backing the Box", "Double down", "Split" and "Insurance".

At "Backing the Box" several players (community of players) place their bets in one and the same box.

At "Double down" the player may double his initial bet during the game, whereby he has to place the double bet next to the initial bet in his box.

At "Split" player splits the initial two cards and continues his game playing on two hands with two rows of cards, that requests to double the initial bet.

At "Insurance" player insures his bet against "Black Jack" of the bank, whereby he has to bet half of the value of the initial bet on the insurance line.

Player wins at "Black Jack" 3 units for 2, otherwise he wins 1 for 1, and at "Insurance" and "Black Jack" of the bank all insurance bets get 2 units for 1; if the bank fails to have "Black Jack" after an insurance bet, player looses his insurance bet, but plays a regular game using his initial bet.

The cards of the players are placed in a staggered way, so that all card values stay visible. The dealer's cards are placed side to side without overlapping each other.

The gaming chips (jettons) are disk like pieces of plastic. Their value is printed (e.g. 10, 20, 50, 100, 500) and they are marked by different colors (e.g. blue, red, green, orange, violet) according to their respective value.

The invention is designed to solve the following problems:

In casino business there is a leak of technical control at the so called table games (live games); this concerns in particular the card game "Black Jack" which may be played in various ways. Even by high substantial staff complement in form of additional monitoring staff and despite the use of optical surveillance systems, there are considerable security loopholes which may result in a reduced gaming revenue for the casino or the casino operator. On the other side there is a lot of responsibility with the dealers, who need a high level of concentration to maintain a strictly regulated game same as correct payments of wins to players. He has to account against the bank at the end of each duty and during all these duties errors may arise.

Therefore it is necessary to find a solution, which will allow a reliable surveillance during the whole gaming performance without human manpower. It should recognize appearing errors and mistakes same as incorrect decisions by the dealer and ease to correct them. In the event of disagreement between player and dealer or between the dealer and casino operator, it should be possible to revise any game in a reliable manner; a solution which avoids incorrect ways to influence the game in particular in favor of certain players at the calculation of wins or at the payment of wins; a solution which creates an easier job for the dealer; a solution which, apart of other advantages, simplifies the process of accounting between the dealer and the casino management in a correct and comfortable manner. Beside that it is a target to deliver firm information about the dealers performance and the individual gaming characteristics of the player.

SUMMARY OF THE INVENTION

It is an object of the invention to provide a fully automatic system of surveillance, controlling and tracking in particular for the game of "Black Jack"; it should survey, control, track and permit use of the registered data under different circumstances depending on gaming and casino specific needs, digest and monitor them from the moment when the card leaves the card shoe until the moment of calculation of the result of the actual game.

This requires the following:

The course of the game shall be automatically tracked in, if possible, all phases of the game and by the use of a computer and a specific electronic data processing program, being tracked, stored, and shown on a monitor or display, visible for the dealer.

The card shoe shall include a device for automatic recognition and tracking of the value of each gaming card drawn out of the card shoe in a covered way (face down).

The gaming table shall include a device for automatic recognition of played or not played boxes (hands), whereby it has to realize multiple bets on each hand and the use of insurance lines. Further more, the gaming table shall include a device to recognize automatically the number of cards placed in front of each player and the dealer.

The values of the gaming chips used shall be recognized, tracked and stored.

In particular, the electronic data processing (EDP) program shall process the value of all bets on each box and associated insurance line; shall control the sequence of delivery of the cards, shall control the distribution of the gaming cards to each player and the dealer, shall calculate and compare the total score of each hand and the dealer's, and shall evaluate the players' wins.

All important gaming data shall then be processed by means of EDP program and shown simultaneously to the actual game at a special monitor or display. Same data shall be recalled later on to monitor the total results whenever requested, whereby there should not be any limits to the possible variations of EDP software program.

According to the invention the gaming apparatus for a game of chance, preferably black jack, played with playing cards and gaming chips comprises:

a gaming table and a gaming table cloth arranged on the gaming table, the gaming table cloth provided with betting boxes and areas designated for placement of the gaming chips and other areas designated for placement of the playing cards;

a card shoe for storage of one or more decks of playing cards, this card shoe including means for drawing individual ones of the playing cards face down so that a card value imprint on the drawn card is not visible to a player of the game of chance;

card recognition means for recognizing this card value imprint on the drawn card from the card shoe, this card recognition means being located in the card shoe;

an occupation detector unit including means for registering a count of gaming chips placed on the designated areas and another count of playing cards placed on the other designated areas on the table cloth, this occupation detector unit being located under the table cloth and consisting of multiple single detectors allocated to each betting box, each area for chips and each other area for playing cards respectively;

a gaming bet detector for automatic recognition or manual input of gaming bets; and a computer including means for evaluating the play of the game of chance according to the rules of the game of chance, means for storing results of the play of the game of chance and means for displaying a course of the play of the game of chance and the results from electronic signals input from the gaming bet detector, the occupation detector unit and the card recognition means.

According to a preferred embodiment of the invention the card recognition means comprises an optical window arranged along a movement path of the card image imprint on the playing card drawn from the card shoe; a pulsed light source for illuminating a portion of the drawn playing card located opposite the optical window; a CCD image converter for the portion of the drawn playing card located opposite the optical window; an optical device for deflecting and transmitting a reflected image of the card value imprint from the drawn playing card to the CCD image converter from that portion of the drawn playing card when the drawn card is exactly in a correct drawn position opposite the optical window; and sensor means for detecting movement of the drawn card and for providing a correct timing for operation of the pulsed light source for transmission of the reflected image to the CCD image converter. The optical device for deflecting and transmitting the reflected image can comprise a mirror arranged to deflect the reflected image to the CCD image converter. Alternatively, the optical device for deflecting and transmitting the reflected image comprises a reflecting optical prism having two plane surfaces arranged at right angles to each other, one of which covers the optical window and another of which faces the CCD image converter and comprises a mirror, and the pulsed light source is arranged behind the latter plane surface so as to illuminate the drawn card when the drawn card is positioned over the optical window. Advantageously the sensor means for detecting movement of the drawn card and for providing a correct timing comprises a single sensor, preferably either a pressure sensor or a photoelectric threshold device, for sensing a front edge of the drawn card to determine whether or not the drawn card is being drawn and to activate the CCD image converter and the pulsed light source when a back edge of the drawn card passes the sensor means. Alternatively, the sensor means can include two electro-optical sensors, one of which is located beyond a movement path of the card image imprint on the drawn playing card and another of which is located in a movement path of the card image imprint on a drawn playing card. The latter electro-optical sensor can includes means for activating the pulsed light source by sensing a color trigger when the card value imprint passes over the optical window. In preferred embodiments of the card shoe the pulsed light source comprises a Xenon lamp.

In various preferred embodiments of the gaming apparatus the single detectors of the occupation detector unit each comprise a light sensitive sensor for detection of chips or playing cards arranged on the table cloth over the respective single detector. Each single detector can be an infrared sensitive photodiode, preferably a silicon photodiode. Advantageously the single detectors can be arranged in the occupation detector unit so that the chips or playing cards placed over them on the table cloth are arrange over at least two single detectors.

The gaming apparatus preferably includes automatic means for discriminating colored markings or regions on the chips and for producing a bet output signal in accordance with the colored markings or regions and the number of chips having identical colored markings or regions.

Advantageously the gaming bet detector can include automatic means for discriminating between chips of different value in the game of chance and means for producing a bet output signal in accordance with the different values of the chips when the chips are bet by a player. In preferred embodiments the gaming bet detector includes a radio frequency transmitting and receiving station and the chips are each provided with a transponder responding to the transmitting and receiving station so that the transponder transmits the values of the bet chips back to the transmitting and receiving station.

The connection between the individual units of the gaming apparatus and the computer can be either a wireless connection or a cable connection.

It should be mentioned that according to the prior art there is no solution publicly known and available for this complex task. According to DE 38 07 127 A1 there is known a device for registration of value of playing cards, but this device does not mean a card shoe for covered distribution of playing cards and is a device for calculation of total scores, which every player has got in his hands at card games like Skat, Romme, Bridge, Poker at the end of each game. This device helps to faster calculate and register the results of the game, which preferably are monitored on a display of the device. In order to read their value, the playing cards are preferably marked by a machine readable barcode system and are placed inside of the device and pursuit through the device automatically card by card.

On the other hand, according to U.S. Pat. No. 5,078,405, there are known table games for casinos available for games like Black Jack and Poker, which provide side games for Jackpot systems. To this end the in general regular gaming table includes coin acceptors and counting meters which register the coins entered and the total amount available for the Jackpot unit, same as a processor to calculate the Jackpot payout. Each player has the option, beside the basic game as Black Jack or Poker, to join playing the side game by entering a coin of one general value unit (e.g., one Dollar) into the coin acceptors entrance in front of his box. According to the result of the basic game and the rules of the extra game the player may have a portion or the total of the presented Jackpot or nothing. However, this device for the side game is not linked to the procedure of the basic game, and for sure not dedicated to monitor, control or survey the basic game itself.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figures 1, 2, 3:
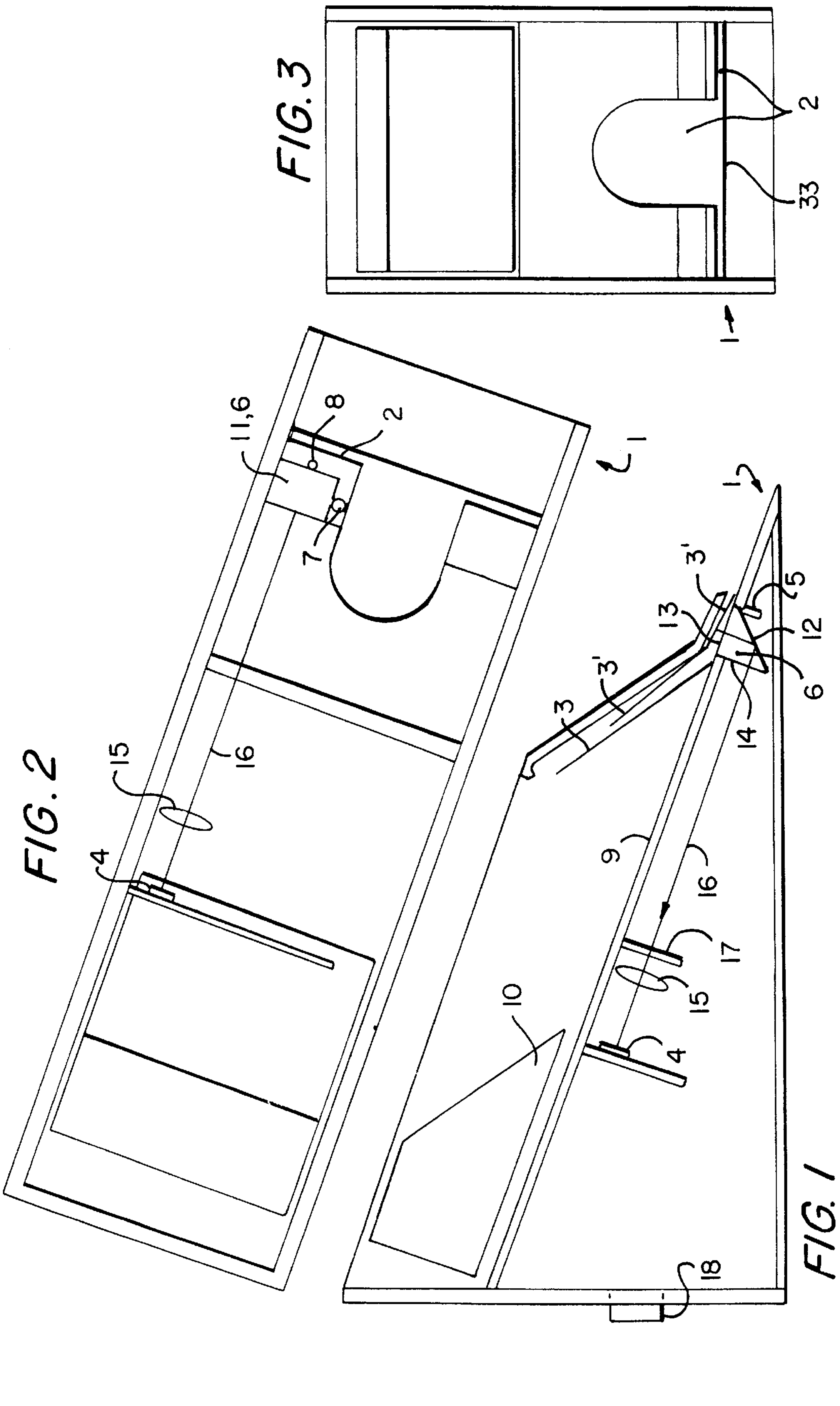
FIG. 1 a card shoe according to the invention, in a vertical cross-sectional side view.
FIG. 2 a horizontal cross-sectional view from above of the card shoe of FIG. 1.
FIG. 3 a front view of the card shoe of FIG. 1.

The design of the card shoe as shown in FIG. 1 through FIG. 3 follows, concerning its outside shape and its upper part, in general the shape of regular conventional card shoes. According to the invention there is provided an integrated device for recognition of the cards' value of the cards 3' drawn out of the card delivery 2 face down (Card Value Recognition Device, CVRD). This CVRD includes essentially following functional parts: one TV camera or CCD-image converter 4 (charge-coupled device); an pulsed light source 5 (flash light lamp) to illuminate that part of the drawn card 3', which holds the card value imprint 31; an optical right angle deviating prism 6 for illumination of the card value imprint 31 and for the transmission of the illuminated card value imprint 31 over an optical path into the CCD-image converter 4; and two optical electronic movement or position sensors 7, 8, to determine the movement of the drawn card 3' and to control the pulsed light source 5.

Figure 4:
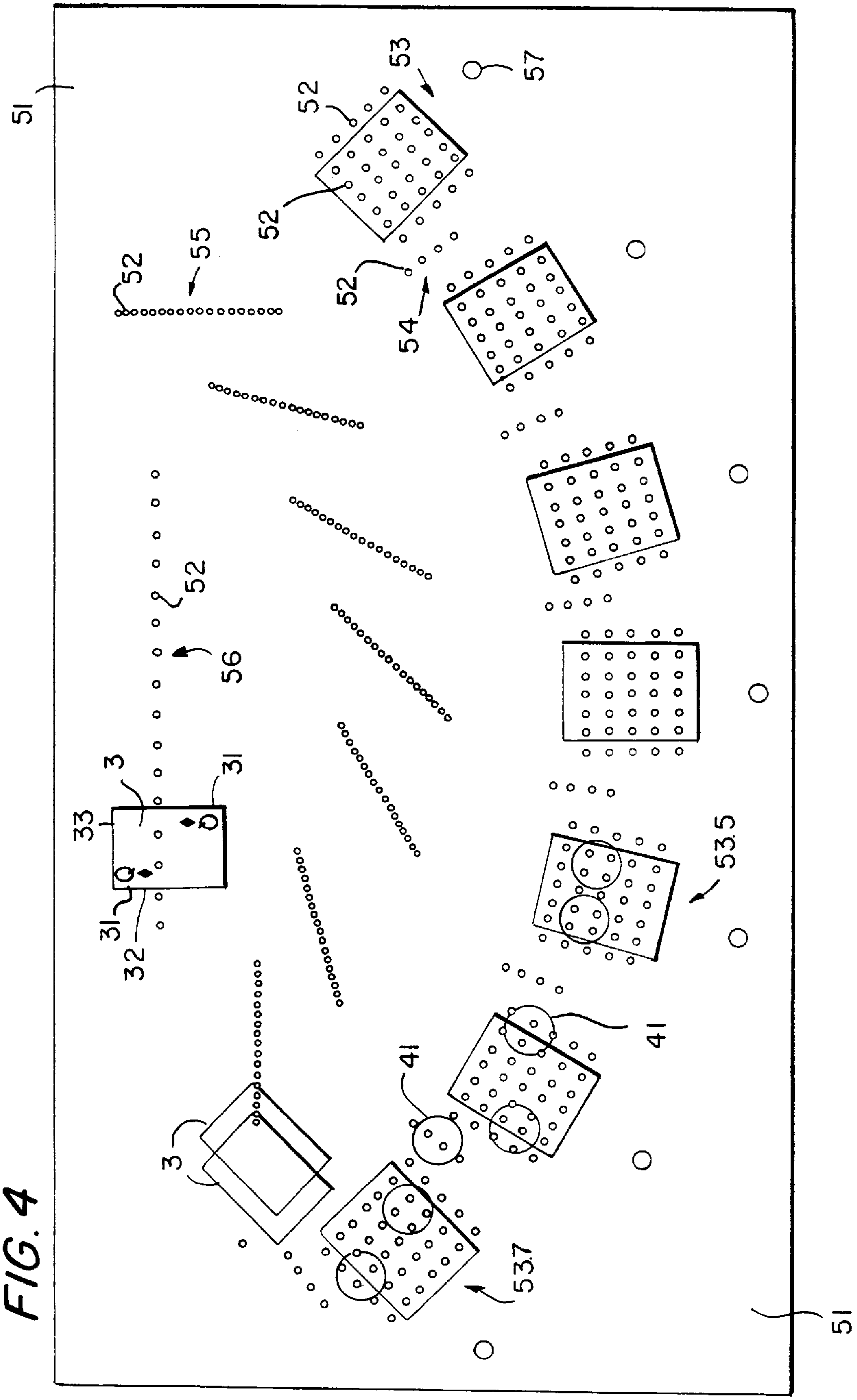
FIG. 4 a top view of the essential part of the gaming surface of a "Black Jack" gaming table according to the invention with hidden devices arranged under the cloth of the gaming layout for automatic recognition of use of gaming chips at boxes and insurance lines on the one hand, and the location of distributed and placed playing cards on the other hand.

The playing cards 3, for which the Queen of Diamonds serves as an example in FIG. 4, are in conformity with the international standard for card format and illustrations; the dimensions of each playing card 3 are 88 mm×62 mm (vertical size) and there is a white framing around the central illustration. The card value imprint 31 is placed just below the top edge of the card on the left hand side (e.g., the capital Q), and just below the value—separated by a white space—is the colored suit symbol 32 (e.g., the diamond symbol). The card name, made up of the color suit symbol 32 and the card value imprint 31 is also printed in the right hand bottom corner of the card (upside down). The card name for the color suit symbols is black for Clubs and Spades and red for Hearts and Diamonds; the height of the card value imprint 31 is (up to) 15 mm.

The playing cards 3 have been placed in the card shoe 1 in such a way that one of their transverse sides 33 is resting at a forward inclined slant or support 9, and the cards are inclined backwards and face down. The angle of the cards 3 against the support 9 is determined by a trapezoidal sliding wedge 10, which also pushes the cards 3 toward the card delivery 2. For the sake of clarity, only two playing cards 3,3' are shown in FIG. 1; card 3' is in the position of being drawn by the dealer.

The support 9 extends over the card delivery 2 and has, in the vicinity of the card delivery, but still on the inside of the card shoe 1, a window 11 which is covered by one of the optical planes of the rectangular deviating prism 6 and lies in the path of the card value imprint 31. Therefore the prism 6 must be basically arranged on the left or the right border of the path of the drawn card 3'.

The prism 6 is arranged in such a way that its plane 12 opposite to its right angle, in the following referred to as mirror plane, shows in the opposite direction with respect of the CCD-image converter 4. The plane 13 of the prism 6 constituting the window 11, in the following referred to as window plane, and the plane 14 of the prism 6, which looks towards the CCD-image converter 4, is referred to as exit plane.

The pulsed light source 5 is just below the mirror plane 12 in the vicinity of that end of the deviating prism 6, that forms the angle (of 45 degree) with the window plane 13. The light of the pulsed light source 5 falls through the mirror plane 12 and the window plane 13 onto the picture side (illustrated side) of the card 3', is reflected from the illuminated card 3' through the window plane 13 onto the mirror plane 12 and is then reflected through the exit plane 14 in the direction of the image converter 4, so that that part of the card 3' being over the front of the window 11 will be projected on the image converter 4 by means of a convex lens 15. A red light filter 17 (>600 nm), lying in the light path 16 in front of the lens 15, serves to the registrability of red colored card values imprints 31. Because of the optical geometric set-up of the light source 5 toward the prism 6, the light source 5 will not be immediately transmitted to the image converter 4.

Instead using a deviating prism 6 for passing the depicted image of the illuminated card value imprint 31 through an optical path into the CCD-image converter 4, one can use advantageously a non-transparent mirror (not shown) which will then occupy the position of the mirror plane 12 of the prism 6. In this case the pulsed light source 5 is to be arranged in front of the mirror plane 12 (of the mirror), instead of behind the mirror plane 12, and is to be screened in such a way that the light source 5 does not shine immediately either in the image transformer 4 or in the mirror.

For the intended depiction of the card value imprint 31 of the drawn card 3' in the image converter 4, it is necessary that the pulsed light source 5 flashes at exactly the same time as the (facing down) card value imprint 31 is over the window 11.

The playing cards have the value imprint 31 twice, and appropriately that card value imprint 31 is measured that—with respect to the card delivery opening 2—is on the right hand side of the white framing of the card 3'. Accordingly, the prism 6 has been set up on the right, as shown in FIG. 4. When drawing a card 3', the following markings of the card 3' pass over the window 11: the front edge 33 of the card 3', the unprinted long part of the white side strip of the card, the color suit symbol 32, the narrow white space between the color suit symbol 32 and the card value imprint 31, the card value imprint 31, and the back edge of the card 3'.

The above mentioned sensor arrangement must recognize the fact that a card 3' has been drawn and must ignite the impulse light source 5 at possibly exactly that moment when the card value imprint 31 is passing over the window 11.

To this end two principle methods of solution are given in the following, whereby the one requires the use of only one sensor, and the other method requires two sensors 7, 8 as indicated in FIG. 2.

If only one sensor is provided, per example the front and the back edges of the card are used as reference markings, whereby the sensor is situated in the card shoe 1 at any lateral position and, looking in the direction of the movement path of the card 3', is placed at a defined vertical distance in front of the window 11 in such a way that the back edge of the card will leave the sensor when the card value imprint 31 is precisely over the window 11. The mentioned sensor can be either a pressure sensor or a photoelectric barrier. When the front edge of the card touches the sensor it switches on the measuring device; when the back edge of the card leaves the sensor it activates the pulsed light source 5, after which the measuring device switches off again.

According to the arrangement illustrated in FIG. 2, two optical electronic sensors 7, 8 are used. Sensor 7, situated further inside the card shoe 1, serves as a movement indicator for the drawn card 3' and activates the measuring device. However, the sensor 7 does not need to be as close to the window 11 as indicated in FIG. 2. The sensor 8 which lies in the path of the moving card value imprint 31 and behind the window 11, shall recognize when the card value imprint 31 is exactly over the window 11 and shall activate the light source 5.

According to the embodiment illustrated in FIG. 2, the sensor 8 is situated adjacent to the window 11 and in this manner registers the narrow white space between the color suit symbol 32 and the card value imprint 31. The sensor 8 can also be situated at a defined distance from the window 11 in order to detect the coming color suit symbol 32 and uses this as a reference markings to activate the lamp 5.

As compared to the technique using only one sensor, the advantage of the technique using two sensors 7, 8 is that this sensor 8, which is responsible for determining the exact position of the card value imprint 31 over the window 11, is fully covered by the card 3' and will thus not be disturbed by outside light, as it could happen with respect of the back edge of the card when using only one sensor, if the sensor is not a pressure sensor but a light barrier.

The sensor 8 switches on the pulsed light source 5 without significant delay so that, as described above, the card value imprint 31, or at least a representative part thereof, is projected on the CCD-image converter 4 and the signals received are registered as the card value of the drawn card 3'.

The technical and, in particular, the electronic measures and control programs needed to realize the above processes are common for the professionals and do not require any particular explanation.

However, it should be noted that the card value recognition device (CVRD) should first "learn", on the one hand, to recognize the card values and, on the other hand, to evaluate the card values in accordance with the rules of the game. Towards this end, at a previous phase of programming the card values (the numbers 2 through 10 and the capitals A, J, Q, K) are projected into the image converter 4, and then the signals received by the image converter 4 are coded in accordance with the card value. The CCD-image converter 4, functioning as numerical camera, and the signaling and data processing system connected to it, will also be capable of identifying the "total picture" of the imprint 31 in such situations where a card 3' is drawn and the card value imprint 31 is not exactly over the window 11 when the pulsed light source 5 lights up, so that only a part of the card value imprint 31 is projected in the image converter 4. This ensues from the fact that the top or bottom half, respectively, of each number or capital imprint 31 differs from any respective fragment of the other pictures of the numbers or capitals.

In gaming practice the speed by which a card 3' is drawn from the card shoe 1 will not exceed 1 m/s. Thus, based on a card movement speed of 1 m/s and a window length of 15 mm, it will take 15 ms for each image point of the card value imprint 31 of 15 mm to pass over the window 11. With a response time of approximately 0.1 ms from the moment of registering the reference markings of the card 3' inducing the flash light until the pulsed light source 5 lights up, the card value imprint 31 will lie fully or almost fully over the window 11 and will be received fully or almost fully by the CCD-image converter 4; with a lamp flash duration of about 10 microseconds a quasi-still image of the card value imprint 31 will be detected and thus a not smeared image of the card value imprint 31 will be produced on the target of the image converter 4.

When illuminating the card value imprint 31 of a card 3' with a xenon lamp at a distance of 20 mm (e.g. through the peripheral range of a deviating prism 6, as further described above) using a 500 Volt xenon lamp having an output of 0.01 W and a duration of the lamp flash of 10 microseconds, in view of the reducing effects of the color filter 17 perfect and reliable registration of the card value imprint 31 were produced, even if the speed by which the playing card is drawn exceeds 1 m/s.

The following explanation relates to a gaming table according to the invention.

According to the system for a "Black Jack" table shown in FIG. 4, detectors situated under the table cloth 51 will be used. These detectors can be based on various mechanical or physical principles, e.g. pressure-sensitive detectors (piezo sensors; tension spring sensors) or—where the chips and playing cards share similar material properties—on electromagnetic or other technical principles.

According to the invention preferably light-sensitive detectors are used, particularly photodiodes 52 in form of infra-red sensitive silicone diodes. The advantage is that these photodiodes can detect as well chips 41 as playing cards 3 placed on the table.

In order not to disturb the usual external appearance of the gaming surface, the photodiodes 52 must be set up under the table cloth 51, whereby the table cloth (layout) 51 must have a certain light permeability, in particular for the near infrared light (IR-light) coming from the artificial casino lighting.

In this connection the table cloth 51 should let through the IR-light of the near IR-range in an order of about 30% of the light energy falling on the table cloth. If the common material from which the table cloths 51 are made, does not permit such light permeability, it will be necessary for the purpose of the invention to choose a material that lets through sufficient light.

The detection principle is as following. All zones of the table cloth 51 on which the gaming chips and playing cards are to be placed in accordance of the gaming rules will, according to the type of game, cover an adjusted grid or an adjusted row of light detectors in such way that each object placed on the table cloth 51 (chips, playing cards) will cover, for safety reasons, at least two, and preferably three or four, of the photodiodes 52, and so will cause these photodiodes 52 excluded from receiving light to work in the sense of the operating system.

As per FIG. 4, a geometrical grid of photodiodes 52 is placed under each rectangular box 53, while for the other zones of the gaming surface of the table cloth 51 photodiodes 52 are laid out in rows, so under the insurance lines 54, under the layout areas 55 for the cards of the players and under the layout area 56 for the cards of the dealer.

According to the embodiment shown in FIG. 4, seven rows of photodiodes 52 of five diodes each have been set up for the boxes 53 in such way that the two outer rows are positioned outside of the box marking 53 printed on the table cloth 51.

A row of four photodiodes 52 is positioned under each insurance line 54; however, more diodes 52 or a double row of diodes can also be positioned here.

In the example illustrated in FIG. 4, in accordance with the normal measurements of a "Black Jack" table and the boxes 53 and insurance lines 54, the photodiodes under each box are spaced 19 mm apart, while there is a distance of 15 mm between each row of diodes, so that a gaming chip of e.g. 40 mm in diameter will cover in the most unfavorable situation four diodes and in the most favorable situation five diodes. Although the dimming effect may be incomplete for those photodiodes which were only covered by the edge of the chip because of the stray light falling over the edge of the chip, a minimum of two diodes will have been optimally covered. For the rest, it should be assumed that even to the optimally darkened photodiodes falls still about 10% of the light energy which has passed through the table cloth 51 so that the sensitivity of the photodiodes 52 must be adjusted to this only achievable brighter-darker effect.

In accordance with the stacked position of the playing cards shown with respect of the box 53.7, the distances between the photodiodes 52 should be smaller, e.g. 7 mm, while for the registration of the cards of the dealer, which are not overlapping but will be placed next to each other, a distance of 25 mm between the photodiodes should be sufficient, that each card will cover at least two photodiodes.

As to the boxes 53 there are shown different positions for placing chips 41 as "Box", "Double Down", "Split", and "Insurance".

The explanations given above for the covering of the photodiodes 52 by chips 41 are basically the same for the playing cards 3 that have been laid out.

In the result, the signals coming from the photodiodes 52 are to be processed as a batch or separately in such way that the electronic switching logic can recognize multiple stakes of chips 41 in a box 53 and further the number of cards placed in front of each player, including where there is a second row of cards ("Split"); it must also process the shifting or adjustment of the chips or cards in accordance with the variations of "Double Down", "Split" and "Insurance".

The given disclosure of the technical principle will enable the experts, such as technical designers, electronical engineers and computer programmers, to realize a gaming table in accordance with the invention, including the integration of automatic control systems for adjusting the sensitivity of the photodiodes for changes in brightness in the gaming room, for example, when switching additional lamps on or off.

Furthermore the professionals involved in setting up the system may, on the basis of economic considerations and depending on the desired functional reliability of the system, deviate from the above values for fitting the photodiodes 52 of the various playing areas (boxes, insurance lines, card fields).

To complete the gaming table device in the sense of a gaming equipment which operates as fully automatically as possible, a switching key (not shown) is provided which will be activated by the dealer after the stakes have been placed, and signaling switches 57 or similar are provided for the players which the players can use to indicate not to wish to receive any more cards.

The following explanation relates to the principles and devices for determining the value of the gaming chips (jettons) placed as a stake and for determining the total value of the stake, when there is a stack of chips (Stake Detector).

At "Black Jack" tables usually so called "American Chips" are used; they are distinguished in their different values by different colors. Depending on the "table maximum bet" (limit of bet per game) only three or four different denominations and colors of chips will be used per table.

The bets are automatically registered per example by a hand-held device operated by the dealer which functions as a television camera or scanner. The camera or scanner registers separately the chip or the stack of chips placed by each player; the image received by the camera or scanner is analyzed for it's value, noting the color of the chips and the number of chips of the same color. The total value of the checked stake is then transmitted to the EDP unit. If the chips have graphic signs and marks around their edges, which can also represent the value of the chip, then the scanning of the stake will be even easier.

Furthermore, so called "Smart Chips" can be used. These smart chips, also known as "High Security Chips", have integrated electronic components functioning without a battery and acting as transponder for a radio frequency identification system (RFID system), whereby the transponder can interact with a transmitting and receiving device (arranged under the table for example) and transmit a specific signal which corresponds to their value.

The RFID system is as follows: there is a contactless inductive data transmission system that provides bi-directional signal transfer between sending- and receiving (S/R) station and one or more batteryless transponders.

The communication between the S/R station is achieved by means of inductive antennas. From the S/R station to the transponder data and energy are transmitted whereas from the transponder to the S/R station only data is transmitted.

The transponder has an antenna circuit or network which is formed by one or more coils for wireless inductive signal transfer. The coil is connected to a single chip which contains all necessary equipments for receiving, recovering and transmitting a signal from or to the sending and receiving station. Additionally the chip contains a data storage or memory.

The sending and receiving station which comprises an oscillator capable of generating a high frequency signal for the simultaneous transmission of energy, clock and information to the transponder. The station also includes demodulator and modulator, a control unit and interfaces.

When applying the RFID-System on the casino-chips with transponder (in the following referred to as transponder-jettons) the S/R station comprises an electronical read/write unit and is wired up with several coils as inductive antennas for the signal transfer to and from the transponder-jetton whereby to each box (including its insurance line) of the gaming table such an inductive antenna (loop antenna) for the communication of the S/R station with transponder-jettons placed on the box is designated.

The gaming-value of the jetton is stored in the memory of the chip of the transponder.

The read/write unit supports a special anti-collision algorithm which allows to operate and identify the different transponder-jettons, at the same time within the antenna field of the read/write unit.

All transponder-jettons within the antenna field lie parallel to the table and have to be stacked up. The read/write unit selects and identifies the electronic unit, included in the jetton. The recorded data can be transmitted via a interface of the read/write unit to a connected host.

If a stake detector operating according to one of the methods as described above is not available, then as in the past the dealer can determine the bet and can enter the information into the calculation and evaluation system through the data entry device.

The following explanations relate to the total gaming equipment according to the invention.

The data registered for each functional technical unit—inter alia, the card value recognition device of the card shoe 1, the gaming chip and playing card registration devices of the gaming table, and the gaming bet detector (camera or scanner; RFID system), or the manually operated data entry device, respectively, for the values of the gaming bets—are to be transferred as output signals to a central computer, either directly or indirectly. This transmission of the output signals can be made either by cable connection or wireless, e.g., by data radio. Thus, the arrangement 18 shown in FIG. 1 represents either a cable connection or a transmitter for the transmission of the signals coming from the CCD-image converter 4.

The central computer has the task of evaluating the total of registered data in accordance with the EDP program, to show same to the dealer, if do desired, on a monitor or some such, and in general to store the data for further use. In any case, in the game of "Black Jack" it should be avoided that the dealer will be informed of the value of his second card (face down) until this card has been turned face up in the regular way of the game; this is to prevent opening up a new source for the dealer for the possibility of improper actions favoring any particular player.

The gained gaming data can furthermore be used for audio or optical signals, e.g., when the dealer has made a mistake, or the cards have not been dealt in the proper sequence or if the card shoe needs to be refilled with other decks of cards. Further the stored data can be used for judgment of the dealer's and players' performance, for evaluation of daily rounds, for statistical purposes, to link some or all gaming tables of one or more casinos or, in the case of other games then "Black Jack", for cumulative jackpot systems of one or more gaming tables.

However, a gaming equipment according to the invention is not able to check and monitor automatically the wins according to the gaming rules for correct payment by the dealer. But, in view of the settlement of table results (win or loss) between the dealer and the casino, which can be determined by the EDP program now, this will not be particularly significant.

LIST OF REFERENCE SIGNS

1 card slide (card shoe)
2 card delivery
3 playing card
3' playing card (being drawn)
4 CCD-image converter
5 light impulse source
6 deviating prism
7 sensor (card shoe)
8 sensor (card shoe)
9 slant or support
10 sliding wedge
11 window
12 mirror plane (prism)
13 window plane (prism)
14 exit plane (prism)
15 lens
16 light path
17 red light filter
18 connection/transmitter
31 card value imprint
32 color suit symbol
33 transverse side (playing card)
41 gaming chip, jetton
51 table cloth (layout)
52 sensor, photodiode (gaming table)
53 box

54 insurance line
55 place for placing cards (player's)
56 place for placing cards (dealer's)
57 signaling switch

I claim:

1. A gaming apparatus for a game of chance played with playing cards and gaming chips, each of said playing cards having a card value imprint located at a predetermined position thereon, said gaming apparatus comprising a gaming table and a gaming table cloth (51) arranged on the gaming table, said gaming table cloth provided with betting boxes (53) and areas (54) designated for placement of said gaming chips (41) and other areas (55,56) designated for placement of said playing cards (3);

a card shoe (1) for storage of one or more decks of said playing cards, said card shoe including means for drawing individual ones (3') of said playing cards face down so that said card value imprint is not visible to a player of the game of chance;

card recognition means for recognizing said card value imprint (31) on said individual ones (3') of said playing cards (3) drawn from said card shoe when said individual ones (3') of said playing cards are drawn from said card shoe, said card recognition means being located in said card shoe;

an occupation detector unit including means for registering a count of said gaming chips (41) placed on said betting boxes (53) and said areas (54) and another count of said playing cards (3) placed on said other areas (55,56) on said table cloth (51), said occupation detector unit being located under said table cloth (51) and consisting of multiple single detectors allocated to each of said betting boxes (53), each of said areas (54) for said chips (41) and each of said other areas (55,56) for said playing cards (3) respectively;

a gaming bet detector for automatic recognition of gaming bets or for manual input of the gaming bets; and a computer including means for evaluating the play of said game of chance according to the rules of said game of chance, means for storing results of said play of said game of chance and means for displaying a course of said play of said game of chance and said results from electronic signals input from said gaming bet detector, said occupation detector unit and said card recognition means;

wherein said card recognition means comprises an optical window (11) arranged along a movement path of the card image imprint (31) on a drawn one of said playing cards (3) that is drawn in said card shoe;

a pulsed light source (5) for illuminating a portion of said drawn one of said playing cards (3) located opposite said optical window (11);

a CCD image converter (4) for said portion of said drawn one of said playing cards (3) located opposite said optical window (11);

an optical device for deflecting and transmitting a reflected image of said card value imprint (31) from said drawn one of said playing cards (3) to said CCD image converter (4) from said portion of said drawn one of said playing cards when said drawn one of said playing cards is exactly in a correct drawn position opposite said optical window; and sensor means for detecting movement of said drawn card (3') and for providing a correct timing for operation of said pulsed light source for transmission of said reflected image to said CCD image converter when said individual one of said playing cards is in said correctly drawn position.

2. The gaming apparatus as defined in claim 1, wherein said optical device for deflecting and transmitting the reflected image comprises a mirror arranged to deflect said reflected image to said CCD image converter.

3. The gaming apparatus as defined in claim 1, wherein said optical device for deflecting and transmitting the reflected image comprises a reflecting optical prism (6) having two plane surfaces (12,13) arranged at right angles to each other and said reflecting optical prism is positioned so that one (13) of said two plane surfaces covers said optical window (11) and another (12) of said two plane surfaces faces said CCD image converter (4) and comprises a mirror, and said pulsed light source (5) is arranged behind said another plane surface so as to illuminate said drawn card when said drawn card is positioned over the optical window.

4. The gaming apparatus as defined in claim 3, wherein said sensor means for detecting movement of said drawn card (3') and for providing a correct timing comprises a single sensor for sensing a front edge (33) of said drawn card (3') to determine that said drawn card (3') is being drawn and to activate said CCD image converter and said pulsed light source when a back edge of said drawn card is passing said sensor means.

5. The gaming apparatus as defined in claim 1, wherein said single sensor comprises either a pressure sensor or a photoelectric threshold device.

6. The gaming apparatus as defined in claim 1, wherein said sensor means includes two electro-optical sensors (7,8), one (7) of said electro-optical sensors being located beyond said movement path of the card image imprint (31) on a drawn one of said playing cards (3) and another (8) of said electro-optical sensors is located in said movement path of the card image imprint (31) on a drawn one of said playing cards (3) and said another (8) of said electro-optical sensors includes means for activating said pulsed light source by sensing a color trigger when said card value imprint passes over said optical window.

7. The gaming apparatus as defined in claim 1, wherein said pulsed light source comprises a Xenon lamp.

8. The gaming apparatus as defined in claim 1, wherein said single detectors of said occupation detector unit each comprise a light sensitive sensor (52) for detection of said chips (41) or said playing cards (3) arranged on the table cloth over the respective single detector.

9. The gaming apparatus as defined in claim 8, wherein said single detector is an infrared sensitive photodiode.

10. The gaming apparatus as defined in claim 9, wherein said infrared-sensitive photodiode is a silicon photodiode.

11. The gaming apparatus as defined in claim 8, wherein said single detectors are arranged in said occupation detector unit so that said chips or said playing cards placed over them on said table cloth are arrange over at least two of said single detectors.

12. A gaming apparatus for a game of chance played with playing cards and gaming chips, each of said playing cards having a card value imprint located at a predetermined position thereon, said gaming apparatus comprising a gaming table and a gaming table cloth (51) arranged on the gaming table, said gaming table cloth provided with betting boxes (53) and areas (54) designated for placement of said gaming chips (41) and other areas (55,56) designated for placement of said playing cards (3);

a card shoe (1) for storage of one or more decks of said playing cards, said card shoe including means for drawing individual ones (3') of said playing cards face down so that said card value imprint is not visible to a player of the game of chance;

card recognition means for recognizing said card value imprint (31) on said individual ones (3') of said playing cards (3) drawn from said card shoe when said individual ones (3') of said playing cards are drawn from said card shoe, said card recognition means being located in said card shoe;

an occupation detector unit including means for registering a count of said gaming chips (41) placed on said betting boxes (53) and areas (54) and another count of said playing cards (3) placed on said other areas (55,56) on said table cloth (51), said occupation detector unit being located under said table cloth (51) and consisting of multiple single detectors allocated to each of said betting boxes (53), each of said areas (54) for said chips (41) and each of said other areas (55,56) for said playing cards (3) respectively;

a gaming bet detector for automatic recognition of gaming bets or for manual input of the gaming bets; and a computer including means for evaluating the play of said game of chance according to the rules of said game of chance, means for storing results of said play of said game of chance and means for displaying a course of said play of said game of chance and said results in response to electronic signals input from said gaming bet detector, said occupation detector unit and said card recognition means;

wherein said card recognition means comprises optical means for detecting the card image imprint (31) on said drawn playing card (3') that is drawn in said card shoe, wherein said optical means includes a pulsed light source for illuminating the card image imprint (31) on said drawn play card (3') and a CCD image converter (4) for said card image imprint on said drawn playing card (3'); and sensor means for registering movement of said drawn card into a position suitable to detect the card image imprint and for providing a correct timing for operation of said pulsed light source for transmission of the card image imprint on said drawn playing card to said CCD image converter when said drawn card is in said position suitable to detect the card image imprint.

13. The gaming apparatus as defined in claim 1 or 12, wherein said gaming bet detector includes automatic means for discriminating colored markings or regions of said chips and for producing a bet output signal in accordance with said colored markings or regions and a number of chips having identical ones of said colored markings or regions.

14. The gaming apparatus as defined in claim 1 or 12, wherein said gaming bet detector includes automatic means for discriminating between chips of different value in said game of chance and means for producing a bet output signal in accordance with said different value of said chips when said chips are bet by one of said players, and said gaming bet detector includes a radio frequency transmitting and receiving station and said chips are each provided with a transponder responding to said transmitting and receiving station so that said transponder transmits back to said transmitting and receiving station said value of said chips that are bet by said one of said players.

15. The gaming apparatus as defined in claim 1 or 12, wherein at least one of said gaming bet detector, occupation detector unit and card recognition means are connected to said computer by a cable connection or by wireless radiation data transmission means.

16. The gaming apparatus as defined in claim 1 or 12, wherein said game of chance is black jack and said computer contains a program according to the rules for said black jack.

* * * * *